(12) United States Patent
Nagy et al.

(10) Patent No.: US 10,354,823 B2
(45) Date of Patent: Jul. 16, 2019

(54) HANDHELD POWER TOOL HAVING A RESTART PROTECTION DEVICE

(71) Applicant: Robert Bosch GmbH, Stuttgart (DE)

(72) Inventors: Attila Nagy, Miskolc-Szirma (HU); Attila Petrovics, Sajokerestür (HU)

(73) Assignee: Robert Bosch GmbH, Stuttgart (DE)

( * ) Notice: Subject to any disclaimer, the term of this patent is extended or adjusted under 35 U.S.C. 154(b) by 1118 days.

(21) Appl. No.: 14/525,675

(22) Filed: Oct. 28, 2014

(65) Prior Publication Data
US 2015/0130330 A1 May 14, 2015

(30) Foreign Application Priority Data
Oct. 29, 2013 (DE) ........................ 10 2013 221 915

(51) Int. Cl.
| | |
|---|---|
| H02K 11/00 | (2016.01) |
| H01H 50/64 | (2006.01) |
| H01H 51/28 | (2006.01) |
| B25F 5/00 | (2006.01) |
| H01H 51/27 | (2006.01) |
| H01H 15/18 | (2006.01) |
| H01H 50/66 | (2006.01) |
| H01H 9/06 | (2006.01) |
| H02K 11/28 | (2016.01) |

(52) U.S. Cl.
CPC .............. *H01H 51/27* (2013.01); *B25F 5/00* (2013.01); *H01H 9/06* (2013.01); *H01H 15/18* (2013.01); *H01H 50/66* (2013.01); *H02K 11/28* (2016.01)

(58) Field of Classification Search
CPC .......... H01H 51/27; H01H 9/06; H01H 15/18; H01H 50/66; H02K 11/28; B25F 5/00

USPC ............................................................. 173/2
See application file for complete search history.

(56) References Cited

U.S. PATENT DOCUMENTS

| | | | | |
|---|---|---|---|---|
| 5,401,928 A | * | 3/1995 | Kelley | ..................... H01H 9/06 200/510 |
| 6,469,268 B1 | * | 10/2002 | Schaeffeler | ............ H01H 15/18 200/405 |
| 6,742,601 B2 | * | 6/2004 | Numata | ................ B24B 23/028 173/170 |

(Continued)

FOREIGN PATENT DOCUMENTS

| | | |
|---|---|---|
| CN | 1781678 A | 6/2006 |
| CN | 1902030 A | 1/2007 |

(Continued)

*Primary Examiner* — Robert F Long
*Assistant Examiner* — Xavier A Madison
(74) *Attorney, Agent, or Firm* — Maginot, Moore & Beck LLP

(57) ABSTRACT

A mains-operated handheld machine tool includes a tool housing, an electric drive motor arranged in the housing and configured to drive an associated tool insert, and a slide switch arranged, at least in a longitudinally displaceable fashion, on the tool housing and coupled to a sliding element configured to switch the drive motor on and off. The mains-operated handheld machine also includes a protection device with an electromechanical relay. The protection device is configured to prevent, by way of the electromechanical relay, uncontrolled restarting of the drive motor after an interruption to a corresponding power supply to the drive motor as a result of latching of the relay being canceled.

15 Claims, 14 Drawing Sheets

(56) References Cited

U.S. PATENT DOCUMENTS

| | | | |
|---|---|---|---|
| 2003/0133239 A1* | 7/2003 | Feil | H02H 11/00 361/72 |
| 2006/0060364 A1* | 3/2006 | Lam | H01H 3/20 173/2 |
| 2014/0245620 A1* | 9/2014 | Fankhauser | B25F 5/001 30/374 |
| 2015/0129267 A1* | 5/2015 | Lee | B25F 5/00 173/1 |

FOREIGN PATENT DOCUMENTS

| | | |
|---|---|---|
| CN | 201227812 Y | 4/2009 |
| CN | 201309146 Y | 9/2009 |
| CN | 101642832 A | 2/2010 |

\* cited by examiner

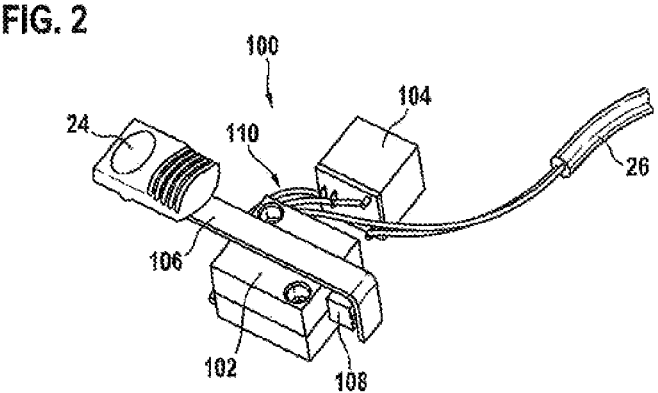
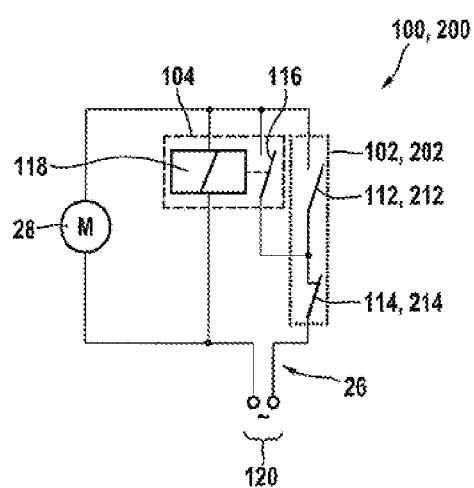

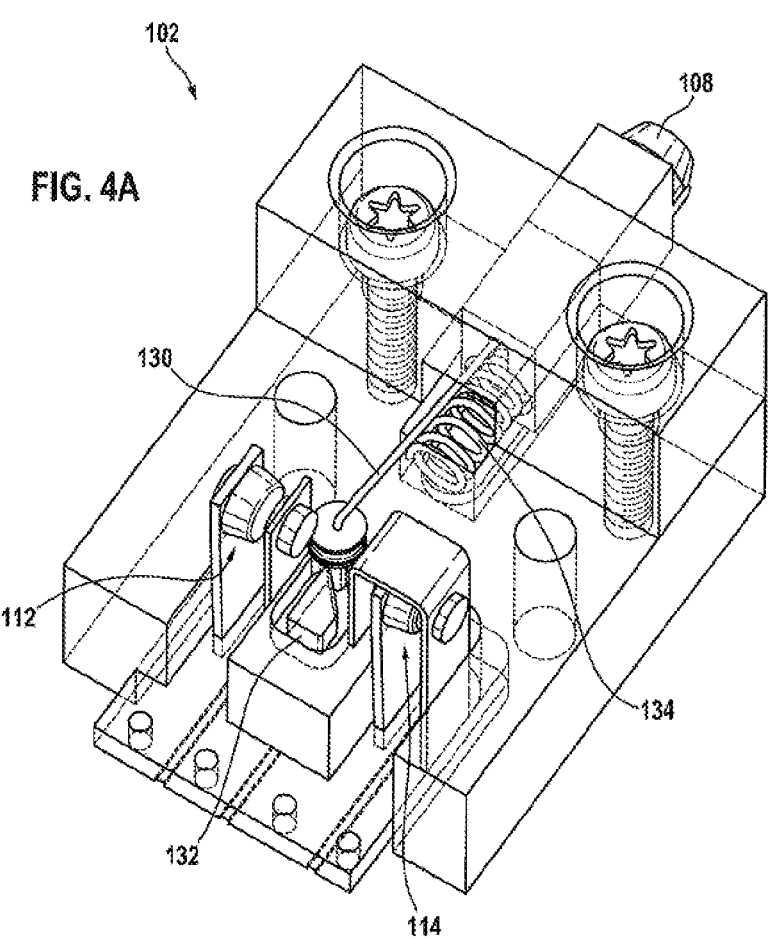

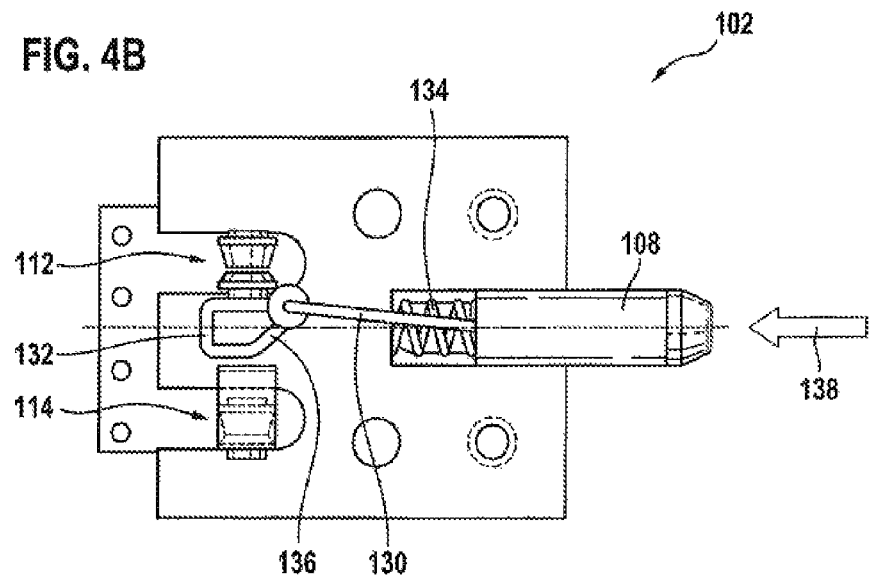
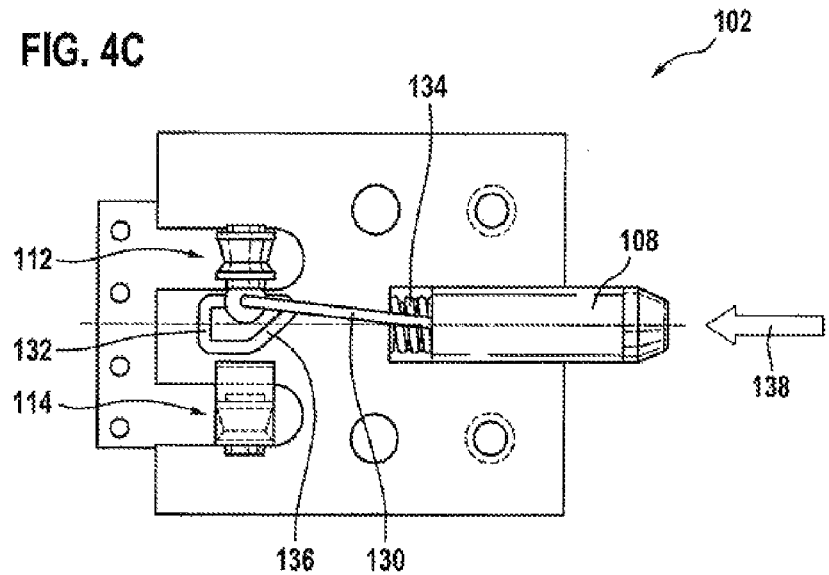

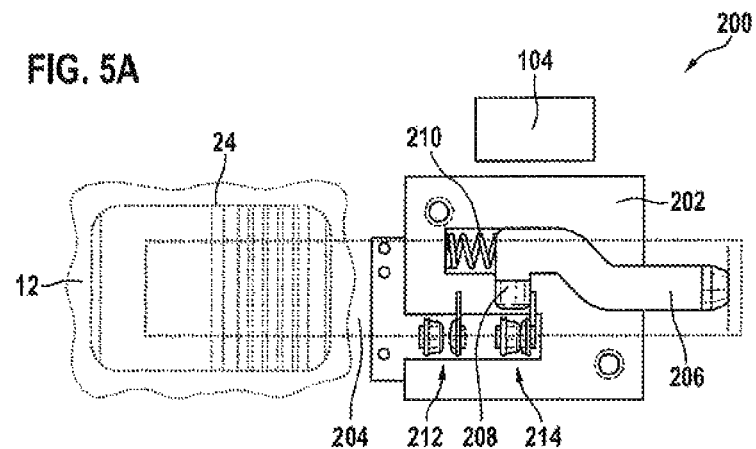
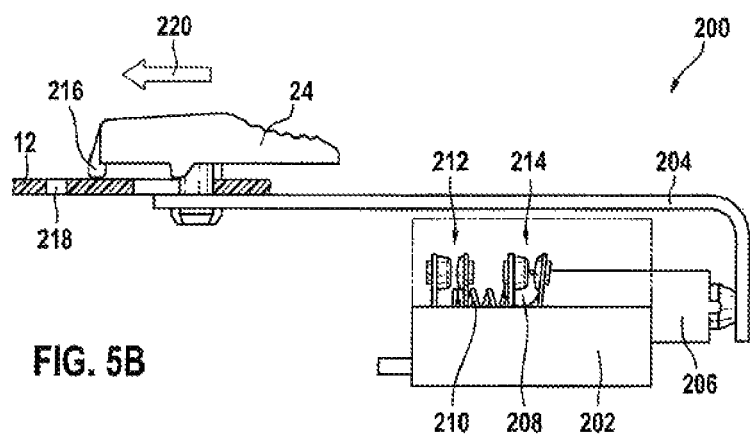

HANDHELD POWER TOOL HAVING A RESTART PROTECTION DEVICE

This application claims priority under U.S.C. § to patent application no. DE 10 2013 221 915.6, filed Oct. 29, 2013 in Germany; the disclosure of which is incorporated herein by reference in its entirety.

BACKGROUND

The present disclosure relates to a mains-operated handheld machine tool comprising a tool housing, in which an electric drive motor for driving an associated tool insert is arranged, wherein a slide switch which is coupled to a sliding element for switching on and off the drive motor is arranged, at least in longitudinally displaceable fashion, on the tool housing.

Such a handheld machine tool which is designed, for example, in the manner of a hand-operated hacksaw or reciprocating saw and in which a saw blade is used as a possible tool insert is known from the prior art. This handheld machine tool has a tool housing and a slide switch or actuating slide actuable by a user for switching on and off an associated, preferably electrically driveable drive motor. The slide switch is conventionally arranged on the side or on top of the substantially cylindrical tool housing and is displaceable by a user, for example parallel to the longitudinal axis of the handheld machine tool, between a rest position and an operating position, in which the drive motor of the handheld machine tool is switched on. Starting from the operating position, the slide switch is movable into a blocking position, in which it is latched mechanically with the tool housing, with the result that it is not necessary for the user to permanently depress or hold firm the slide switch during operation of the handheld machine tool.

One disadvantage with the prior art consists in that, in such a handheld machine tool, latching of the slide switch on the tool housing is purely mechanical. After the occurrence of an incident during operation of the handheld machine tool, for example after a short-term interruption to the power supply, this may result in uncontrolled, automatic restarting of the drive motor of said handheld machine tool and therefore in injuries to the user or damage to an associated tool insert, for example.

SUMMARY

An object of the disclosure therefore consists in providing a novel mains-operated handheld machine tool in which restarting of an associated drive motor after an interruption to an associated power supply can be ruled out in a manner which is particularly simple in design terms, reliable and inexpensive.

This problem is solved by a mains-operated handheld machine tool comprising a tool housing, in which an electric drive motor for driving an associated tool insert is arranged, wherein a slide switch which is coupled to a sliding element for switching on and off the drive motor is arranged, at least in longitudinally displaceable fashion, on the tool housing. A protection device comprising an electromechanical relay is provided, which is designed to prevent, by means of the electromechanical relay, uncontrolled restarting of the drive motor after an interruption to a corresponding power supply to the drive motor as a result of latching of the relay being canceled.

The disclosure therefore makes it possible to provide a mains-operated or mains-fed handheld machine tool in which restarting of the drive motor after a mains interruption is ruled out even in the case of a slide switch which is latched with the tool housing. As a result, the risk of accidents for a user is considerably reduced and damage to an associated tool insert is avoided.

Preferably, the slide switch is accommodated, tiltably, on the sliding element and is latchable to the tool housing in an operating position when the drive motor is switched on.

As a result, an additional means of mechanically securing the slide switch in position is provided when the drive motor has been switched on owing to axial displacement of the slide switch. Preferably, the slide switch is mounted tiltably on the sliding element in a sprung manner.

In a first and second embodiment, the protection device has in each case an electrical switch comprising a make contact and a break contact.

As a result, simple and reliable electrical activation of the relay is enabled.

Preferably, the electrical switch has a plunger, which is pretensioned by means of a compression spring and is axially displaceable, counter to a spring force applied by the compression spring, by means of the sliding element.

As a result, the mechanically unloaded plunger can automatically return to its rest position.

Preferably, the make contact and the break contact are actuable by means of a lever which is accommodated tiltably on the plunger, wherein the lever is guided in a slotted-link slideway with an approximately quadrilateral outline, and the slotted-link slideway has at least one diagonally running slideway section.

Therefore, a simple and uncomplicated connection between the mechanical slide switch and the electrical switch coupled thereto for switching on and off the drive motor via the relay can be formed, wherein it is additionally ensured that the make contact of the electrical switch is always actuated prior to the break contact thereof.

Preferably, the make contact is closable, at least for a short period of time, by axial actuation of the plunger out of a rest position in order to cause the relay to latch and to switch on the drive motor, wherein the plunger remains in a pressed-in position.

As a result, the motor current primarily flows via a make contact of the relay and only for a short period of time via the break contact of the switch.

Preferably, the break contact is openable by a further axial actuation of the plunger for switching off the drive motor in order to cancel the latching of the relay, wherein the plunger is caused to move back into its rest position by means of the spring force of the compression spring.

As a result, even short activation of the break contact by means of the plunger which is mechanically coupled to the slide switch via the sliding element is sufficient for permanently switching off the drive motor. Even in the event of an interruption to the power supply, the latching is canceled since the make contact of the relay opens owing to the then likewise deenergized coil and the make contact of the electrical switch is open and the break contact of the electrical switch is closed, with the result that restarting of the drive motor is reliably ruled out even in the case of the slide switch which is generally latched-in in this configuration.

In the case of the second embodiment, the electrical switch has a plunger, which is pretensioned by means of a compression spring and comprises an actuating hook, wherein the plunger is displaceable axially by means of the sliding element counter to a spring force applied by the compression spring.

As a result of the actuating hook, reliable actuation of the make and break contacts within the electrical switch is ensured.

Preferably, the actuating hook is arranged in the region between the make contact and the break contact of the electrical switch in order to enable alternate actuation of the make contact and the break contact.

As a result, the simultaneous actuation of the make and break contacts within the electrical switch is ruled out.

Preferably, the make contact is opened in a latched-in operating state of the sliding switch and the break contact is closed, wherein the drive motor is switched on by the latching of the relay.

As a result, the short-term closing of the make contact is sufficient for permanently switching on the drive motor. In the case of a mains interruption, the latching of the relay is canceled, as a result of which the drive motor is switched off. The uncontrolled restarting of the drive motor is impossible in the event of a return of the mains supply even in the case of a slide switch which is mechanically latched with the tool housing since the make contact of the electrical switch is open and the break contact of the electrical switch is closed.

In the case of a third and fourth embodiment of the protection device, the sliding element is pretensioned by means of a compression spring supported on the tool housing.

As a result, the effect of the compression spring which is otherwise provided in the electrical switch can be replaced.

Preferably, a contact slide is displaceable within the relay parallel to the sliding element with play by means of the sliding element in order to energize a coil of the relay by forced mechanical closing of a make contact of the relay.

As a result, the relay at least partially takes on the function of the electrical switch which is otherwise required.

Preferably, the relay, for latching purposes, has a bent back armature which is mounted tiltably within the relay and comprises a first and a second limb, wherein owing to the energization of the coil, the first limb is attracted thereby magnetically such that, in the energized state of the coil, the make contact of the relay can be held mechanically in the closed switching state by means of the second limb.

As a result, the latching of the relay and the switching-on of the drive motor of the handheld machine tool can be realized with only one make contact of the relay. In this case, the armature acts as a mechanical holding element for the make contact of the relay in the closed state.

In accordance with the fourth embodiment, the relay has a coil and a plate-shaped armature which is magnetically attractable by the coil, and a make contact of the relay is actuable by means of the armature.

This results in a simplified structural design of the armature of the relay, whose mechanical holding function and pivotable mounting on the relay coil are dispensed with.

Preferably, a plunger which protrudes out of the relay for actuating the armature is displaceable parallel to the sliding element with play by means of the sliding element.

As a result, reliable actuation of the armature for the mechanically forced closing of the make contact of the relay whilst maintaining the course of movement of the sliding element which has been brought about is ensured.

Preferably, the plunger is sealed off from a housing of the relay by means of a sealing element.

As a result, the ingress of foreign particles into the housing of the relay is prevented, which results in problem-free electrical operation of the make contact of the relay without any notable increase in the actuation forces even under problematic environmental conditions.

Preferably, by mechanically forced actuation of the plunger by means of the sliding element, a make contact of the relay is closable and the coil of the relay is energizable in order to switch on the drive motor and cause the relay to latch.

As a result, the permanent switching-on of the drive motor is ensured by the slide switch being actuated once, wherein at the same time protection against restarting in the event of a grid failure is provided by the latching of the relay.

Preferably, the relay, in terms of its outer geometry, is identical in construction to a standard electrical switch for switching on and off the drive motor of the handheld machine tool.

As a result, during mass production of the handheld machine tool, the relay can be exchanged for the standard switch which is otherwise used without any problems, in largely cost-neutral fashion and without any changes to the tool.

BRIEF DESCRIPTION OF THE DRAWINGS

The disclosure is explained in more detail with reference to exemplary embodiments illustrated in the drawings in the description below. In the drawings:

FIG. 2 shows a perspective view of the slide switch shown in FIG. 1 with an associated sliding element and with a first embodiment of a protection device, which has a relay and an electrical switch in accordance with a first embodiment, FIG. 3 shows an electrical circuit diagram of the protection device shown in FIG. 2, FIG. 5A shows a plan view of a protection device in accordance with a second embodiment, comprising an electrical switch in accordance with a second embodiment, FIGS. 5B-5E show side views of the protection device shown in FIG. 5A with four different electrical switching states of the electrical switch shown in FIG. 5A, FIGS. 6 and 7 show two circuit diagrams of a third and fourth embodiment of a protection device.

DETAILED DESCRIPTION

Figure 1:
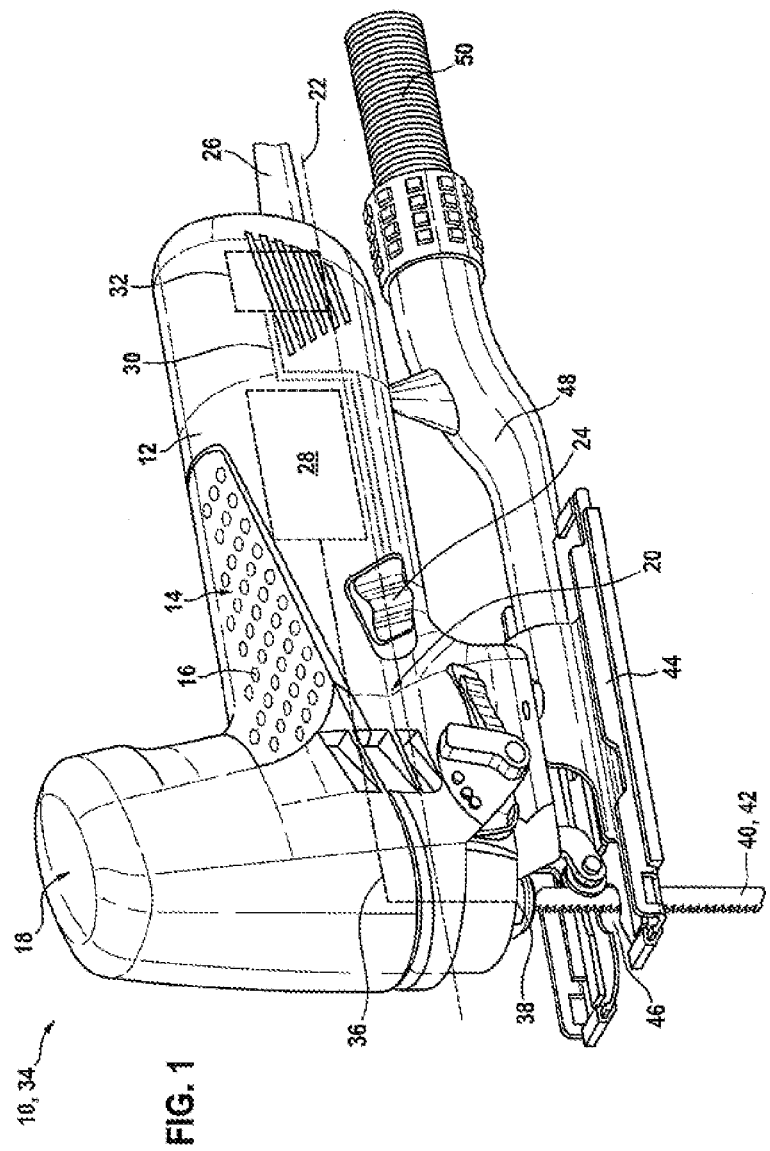
FIG. 1 shows a perspective view of a handheld machine tool comprising a slide switch for switching on and off an associated drive motor.

FIG. 1 shows an exemplary mains-operated or mains-fed handheld machine tool 10, to which power is preferably supplied via a power cable 26. The handheld machine tool 10 has an illustratively at least approximately cylindrical tool housing 12, which preferably at least sectionally forms a handle 14, on which, for example, a rubberized grip surface 16 is provided, and furthermore preferably forms at least one further grip region 18. A mechanically operating slide switch 24 is provided on a housing side 20 of the handle 14, which illustratively has a longitudinal axis 22, which slide switch 24 is longitudinally displaceable in the direction of the longitudinal axis 22. By actuation of the slide switch 24, a user can switch on and off an electric drive motor 28 of the handheld machine tool 10, which drive motor is arranged in the tool housing 12. By means of a protection device 32 which is mechanically coupled to the slide switch 24 via a sliding element 30, in addition to the switch-on and switch-off functionality for the drive motor 28, at the same time uncontrolled restarting of the drive motor 28 after an interruption to the power supply is realized independently of the actuation state of the slide switch 24.

The handheld machine tool 10 is in this case formed illustratively in a manner of a hand-operated hacksaw or reciprocating saw 34, wherein the drive motor 28 can be any desired type of motor, for example an electronically commutated motor or a DC motor. The drive motor 28 is used for driving an output shaft 36, on which, by way of example, a tool holder 38 is arranged and which is used for accommodating a tool insert 40 which is drivable so as to perform a lifting movement, for example a saw blade 42. This is arranged, by way of example, at least approximately perpendicular to a base plate 44 fastened on the tool housing 12 and passes illustratively through a cutout 46 provided in the base plate 44. Furthermore, by way of example, an optional suction device 48, which is connected to a suction hose 50, is arranged on the base plate 44. However, it is noted that the mode of operation and the design of a suitable drive motor 28 or of a suitable hacksaw or reciprocating saw 34 are sufficiently well known to a person skilled in the art from the prior art. Therefore, for the purpose of simplicity and conciseness of the description, a more detailed description of this is not provided here. Furthermore, the disclosure can be used in a multiplicity of mains-operated handheld machine tools which have a slide switch which can preferably be operated by means of the thumb for switching on and off an associated drive motor, such as, for example, in angle grinders, polishing machines, milling machines, pole saws, etc.

FIG. 2 illustrates a protection device 100 in accordance with a first embodiment, with which the protection device 32 shown in FIG. 1 can be realized, and which has an electrical switch 102 and a relay 104. The electrical switch 102 is actuable by a user by means of a sliding element 106 accommodated in longitudinally displaceable fashion on the tool housing (12 in FIG. 1) and the slide switch 24 associated therewith shown in FIG. 1. The slide switch 24 is in this case accommodated tiltably on the sliding element 106 in a sprung manner and is mechanically latchable with the tool housing in an "operating position" when the drive motor is switched on (28 in FIG. 1).

A mechanical actuation of the electrical switch 102 is performed via a plunger 108, which is mechanically fixably connected to the sliding element 106. The power supply to the protection device 100 and the drive motor of the handheld machine tool takes place with the aid of the power cable 26 in FIG. 1. The electrical circuitry required between the electrical switch 102, the relay 104 and the power cable 26 is provided using a plurality of preferably flexible electrical lines 110, in particular litz wires or the like.

FIG. 3 illustrates an electrical design of the protection device 100 shown in FIG. 2 with the electrical switch 102 and the relay 104 actuated thereby, wherein the drive motor 28 from FIG. 1 is in the switched-off state. The electrical switch 102 comprises a make contact and a break contact 112, 114, which are mechanically actuable by means of the plunger 108 from FIG. 2, while the relay 104 has only a (relay) make contact 116, which is electromagnetically activatable with the aid of a coil 118. The power supply takes place, for example, from a (low-voltage) supply grid with a voltage of 230V at a frequency of approximately 50 Hz via the power cable 26.

Starting from the illustrated switching state, in order to switch on the drive motor 28 the make contact 112 of the electrical switch 102 is closed at least for a short period of time by correspondingly displacing the slide switch 24 from FIG. 2 into an "operating position", as a result of which the make contact 116 of the relay 104 closes and causes said relay to latch, with the result that the drive motor 28 remains permanently switched on via the closed make contact 116 independently of the switching state of the make contact 112. Owing to the latching of the relay 104, the slide switch 24 shown in FIG. 2 can be released by the user while work is being performed using the handheld machine tool 10 shown in FIG. 1. As a result of the preferably additional mechanical latching of the slide switch in its "operating position" with the tool housing 12 shown in FIG. 1, there is haptic feedback in respect of the "operating position" of the slide switch being reached and furthermore the position of said slide switch is clearly defined by the latching. If appropriate, the additional mechanical latching of the slide switch 24 can be dispensed with owing to the plunger 108 from FIG. 2 which automatically latches in in the completely pressed-in state.

If an interruption to the power supply occurs, the latching of the relay 104 is canceled since the coil 118 is deenergized and the make contact 116 therefore opens. Uncontrolled restarting of the drive motor 28 is also ruled out in the event of a return of the power supply 120 since, owing to the then open make contact 112 of the electrical switch 102, the relay 104 cannot attract or be caused to latch, and the drive motor 28 remains switched off. During a regular switch-off operation, the slide switch 24 shown in FIG. 2 is displaced by the user out of the latched-in "operating position" back into a "switch-off position", wherein the break contact 114 of the electrical switch 102 is opened for a short period of time and the latching of the relay 104 is canceled and the drive motor 28 is switched so as to be deenergized.

The reference numerals 200, 202, 212, 214 in FIG. 3 relate to a second embodiment of an electrical switch 202, which will be explained below in the context of the second embodiment of the protection device 200 in accordance with FIG. 5A to FIG. 5D. In this case, the electrical functionality of the switches 102, 202 is identical, whereas the mechanical design thereof differs from one another.

FIG. 4A shows the electrical switch 102 shown in FIG. 2 and FIG. 3 with the electrical make and break contacts 112, 114, which are actuable by means of the plunger 108, wherein a lever 130 which is accommodated in articulated fashion on the plunger 108 is guided preferably circularly circumferentially in an approximately quadrilateral slotted-link slideway 132, and the plunger 108 is mechanically pretensioned by means of a compression spring 134 in the axial direction, i.e. in a direction pointing away from the contacts 112, 114 of the switch 102. A cross-sectional geometry of the slotted-link path 132 itself is in this case preferably at least approximately rectangular.

Figure 4D:
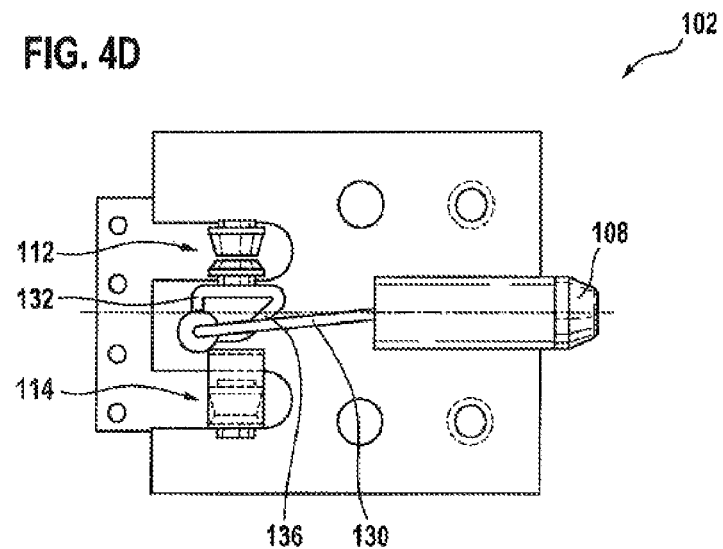
FIG. 4A shows a perspective, at least partially transparent view of the electrical switch of the protection device shown in FIG. 2, FIGS. 4B-4E show views of four different electrical switching states of the electrical switch shown in FIG. 4A.

FIG. 4B to FIG. 4E, to which reference is also made in the description below, show four different electrical switching states of the electrical switch 102 shown in FIG. 4A for explaining the electrical and mechanical functioning thereof. A region of the circumferential, closed slotted-link slideway 132 which faces the plunger 108 is in the form of a diagonally extending slideway section 136. In the position illustrated in FIG. 4B, which is identical to the position illustrated in FIG. 4A, the plunger 108 is in a completely disengaged rest position, wherein the make contact 112 is open and the break contact 114 is closed, and the drive motor 28 of the handheld machine tool 10 shown in FIG. 1 is switched off. By displacing or pressing the plunger 108 in the direction of an arrow 138, the make contact 112 is closed at least for a short period of time, as is shown in FIG. 4C, with the result that the relay 104 from FIGS. 2 and 3 is caused to latch and the drive motor is permanently switched on. Then, the plunger 108 shown in FIG. 4D reaches a completely pressed-in position and remains in this position, wherein the make contact 112 is open and the break contact 114 is still closed.

Figure 4E:
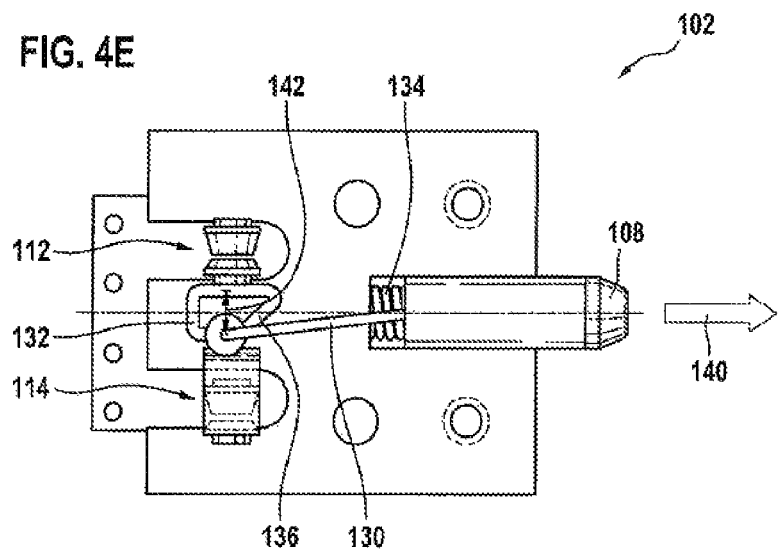

By renewed actuation or slight pressing-in of the plunger 108 beyond its dead center in the direction of the contacts 112, 114, the plunger 108 moves back out of the electrical switch 102 owing to the force effect of the compression spring 134 in the direction of an arrow 140, as shown in FIG. 4E, as a result of which the break contact 114 is opened by means of the lever 130 at least for a short period of time, the latching of the relay is canceled and the drive motor 28 shown in FIG. 1 is switched so as to be deenergized. Once the plunger 108 has passed through the position shown in FIG. 4E, the lever 130 is guided back into its initial position shown in FIG. 4B within the slotted-link path 132, in which initial position the plunger 108 is located in the completely disengaged rest position. A movement of the lever 130 in the opposite direction out of the position shown in FIG. 4B into the position shown in FIG. 4E is ruled out owing to a slight vertical offset 142 within the slotted-link path 132.

It is noted that the positively driven lever 130 revolves in circular fashion within the slotted-link path 132 during inward and outward deflection of the plunger 108 owing to the force effect of the compression spring 134 and therefore takes in each case a different route or branch through the slotted-link path 132 during inward and outward deflection. As a result, the make contact 112 and the break contact 114 of the switch 102 are always actuated successively and in each case only for a short period of time.

FIG. 5A shows a protection device 200 in accordance with a second embodiment, with which the protection device 32 from FIG. 1 can be realized. Said protection device 200 has an electrical switch 202 and the relay 104 from FIG. 2 and FIG. 3. The electrical switch 202 is preferably actuable by a user by means of a sliding element 204 which is accommodated in longitudinally displaceable fashion on the tool housing 12 from FIG. 1, wherein the slide switch 24 from FIG. 1 is fastened tiltably in a sprung manner on the sliding element 204. The slide switch 24 is in turn mechanically latchable with the tool housing 12 in the "operating position" when the drive motor 28 from FIG. 1 is switched on.

The mechanical actuation of the electrical switch 202 takes place via an axially displaceable plunger 206, which has an actuating hook 208 at one end. The plunger 206 is connected to the sliding element 204 so as to slide therewith and is mechanically pretensioned by means of a compression spring 210 in such a way that the plunger 206 can be pressed into the electrical switch 202 counter to the force effect of the compression spring 210.

The electrical switch 202 preferably has a make contact 212 and a break contact 214, between which the actuating hook 208 of the plunger 206 is arranged, as a result of which alternate actuation of the two contacts 212, 214 by displacement of the actuating hook 208 of the plunger 206 is always ensured. In the position of the electrical switch 202 shown, the make contact 212 is open and the break contact 214 is closed. The electrical function and circuitry of the protection device 200 correspond to the electrical circuitry of the protection device 100 shown in FIG. 3, with the result that a more detailed description is not given at this juncture and reference can be made to the explanations relating to the circuit diagram shown in FIG. 3.

FIG. 5B to FIG. 5E, to which reference is also made in the description below, each show side views of the protection device 200 from FIG. 5A with four different electrical switching states of the electrical switch 202 from FIG. 5A for explaining the electrical and mechanical functioning of said switch. In the position of the plunger 206 illustrated in FIG. 5B, said plunger is located in a position in which it is withdrawn from the electrical switch 202 to a maximum extent owing to the force effect of the compression spring 210, with the result that the make contact 212 and the break contact 214 are open to the same degree, the latching of the relay 104 from FIG. 5A is canceled, the drive motor 28 from FIG. 1 is switched off and the slide switch 24 is in its "switch-off position". In this case, the break contact 214 is drawn into its open switching position by means of the actuating hook 208 of the plunger 206 and is also held in this position owing to the force effect of the compression spring 210. Correspondingly, the slide switch 24 and the sliding element 204 have assumed the position in which they are each pushed back to the maximum extent in relation to the tool housing 12 from FIG. 5A and a latching tab 216 formed on the lower side of the slide switch 24 is disengaged from a cutout 218 in the tool housing 12.

Figure 5C:
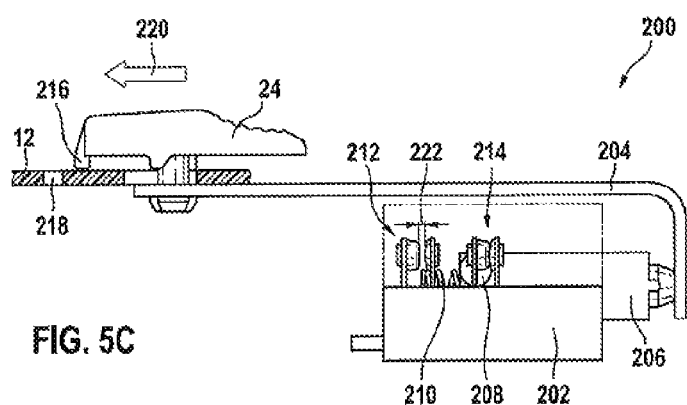

By virtue of a user displacing the slide switch 24 starting from its position shown in FIG. 5B in the direction of an arrow 220, i.e. in the direction of the "operating position" of the slide switch 24, first the break contact 214 of the electrical switch 202 is closed, as shown in FIG. 5C, and in this way the latching of the relay 104 from FIG. 5A is prepared. The make contact 212, on the other hand, still remains in the open state whilst maintaining its contact clearance 222.

Figure 5D:
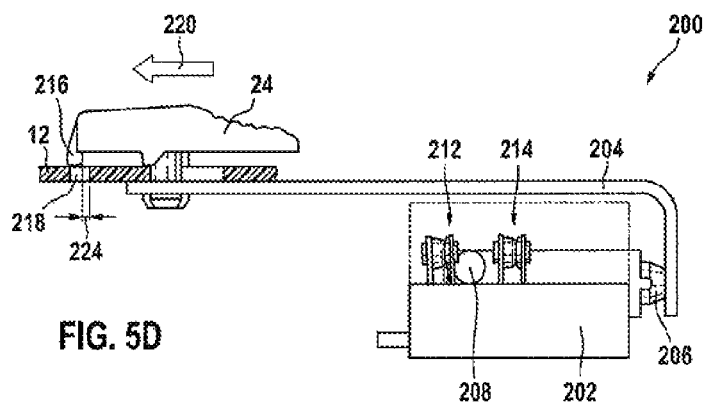

By pushing the slide switch 24 further in the direction of the arrow 220, the make contact 212 then also closes, as shown in FIG. 5D, the relay 104 from FIG. 5A is caused to latch and the drive motor 28 from FIG. 1 is switched on. During this operation, the slide switch 24 overruns its mechanically latched-in "operating position" by a length 224 for a short period of time, as shown in FIG. 5D, however, until a maximum "end position" of the slide switch 24 has been reached. The overrun length 224 in this case corresponds to the distance between the latching tab 216 and the cutout 218 in the tool housing 12 in the position of the slide switch 24 shown in FIG. 5D and is preferably at least 1 mm. Furthermore, the length 224 corresponds approximately to the contact clearance 222 of the unactuated make contact 212 of the electrical switch 202, with the result that, once the slide switch 24 has been released by the user, the slide switch 24 is drawn back automatically out of the "end position" into the "operating position" shown in FIG. 5E owing to a force effect of the compression spring 210, which is counter to an arrow 220, wherein the latching tab 216 latches into the cutout 218 in the tool housing 12, with the result that the slide switch 24 is latched mechanically with the tool housing 12 in the "operating position" which is then reached. Since the length 224 approximately corresponds to the contact clearance 222, the make contact 212 in the latched-in "operating position" is opened again, wherein the drive motor remains switched on owing to the relay with latching. The break contact 214 of the electrical switch 202 remains closed, without any change.

Figure 5E:
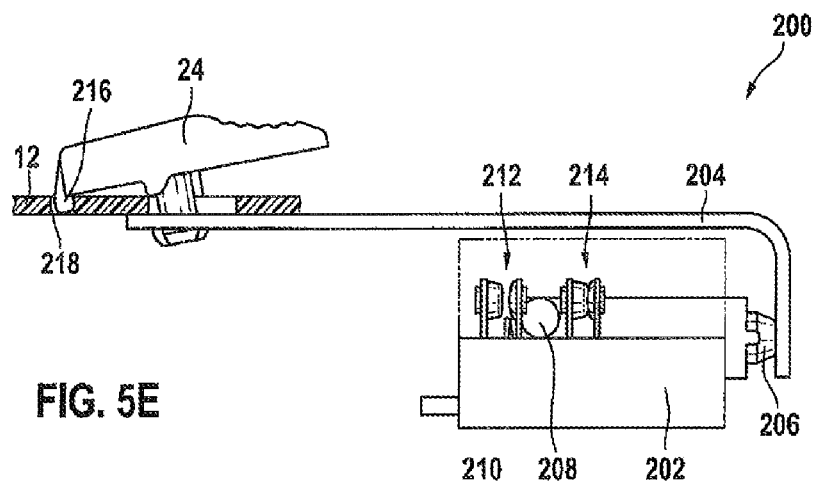

In order for the user to switch off the drive motor 28 from FIG. 1, the slide switch 24 is unlatched from the tool housing 12 starting from its "operating position" shown in FIG. 5E. As a result, the plunger 206 moves back with its actuating hook 202, owing to the force effect of the compression spring 210, until the position shown in FIG. 5B is reached again, in which the make contact 212 and the break contact 214 are open. As a result, the latching of the relay 104 from FIG. 5A is canceled and the drive motor is permanently switched off. If, on the other hand, an unexpected interruption to the power supply takes place in the "operating position" of the slide switch 24 shown in FIG. 5E, the latching of the relay is canceled without delay and the drive motor is switched off by the then opening make contact of the relay without delay. Once the power supply is reestablished, uncontrolled restarting of the drive motor is prevented since the make contact 212 of the electrical switch 202 is open in the latched-in "operating position" of the slide switch 24, as shown in FIG. 5E. In order to switch on the drive motor again in a controlled manner after a power failure, it is necessary for the user to push the slide switch 24 initially out of its latched-in "operating position" back into its "switch-off position" shown in FIG. 5B and to switch on the drive motor again subsequently in accordance with the sequence of switching positions of the electrical switch 202 shown in FIG. 5B to FIG. 5E.

Figure 6:
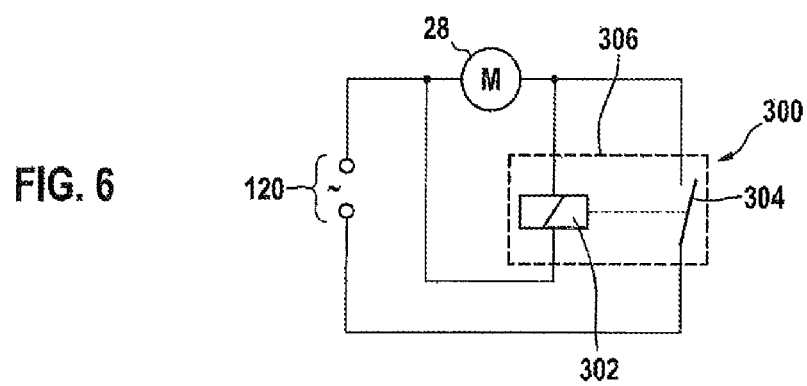
Figure 7:
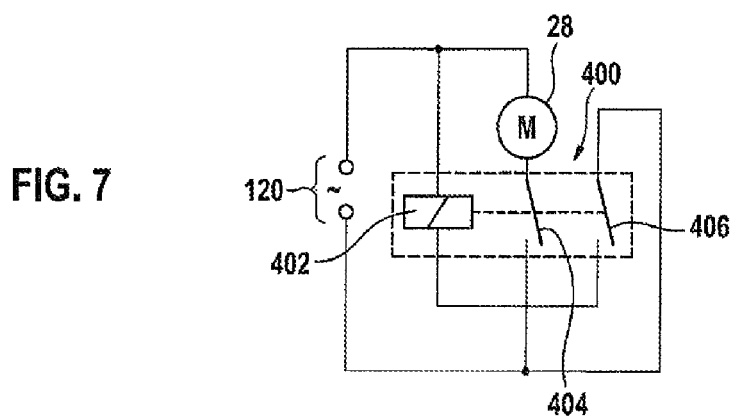

FIGS. 6 and 7, to which reference is also made in the description below, show two circuit diagrams of a third and fourth embodiment of a protection device. In contrast to the two embodiments described above, in the protection device shown in FIGS. 6 and 7 the relay at the same time takes on the function of the otherwise necessary electrical switch.

As shown in FIG. 6, a relay 300 is provided which has a coil 302 which is connected in parallel with the drive motor 28 from FIG. 1. Therefore, the drive motor 28 can be connected to a power supply (for example the power supply 120 from FIG. 3) and switched on by mechanically forced closing of a make contact 304 of the relay 300. The coil 302 and the make contact 304 are illustratively integrated in a housing 306 of the relay 300. As a result of an exemplary parallel circuit of the coil 302 and the drive motor 28, the relay 300 is caused to latch when the drive motor 28 is energized to a sufficient extent, with the result that the drive motor 28 runs permanently. If there is an interruption to the power supply, the latching of the relay 300 is canceled, the make contact 304 opens and the drive motor 28 can be switched on again in a controlled manner only by mechanically forced actuation of the make contact 304.

FIG. 7 shows, in contrast to FIG. 6, a relay 400 comprising a coil 402, by means of which a first and a second make contact 404, 406 are actuable, wherein activation of the coil 402 does not take place by means of the voltage which forms as a voltage drop across the drive motor 28 from FIG. 1 when said drive motor is switched on, but by the second make contact 406 and therefore independently of a drive motor current which is flowing exclusively via the first make contact 404. As a result, a coil current of the relay 400 thus becomes independent of the drive motor current which is flowing through the switched-on drive motor 28. The two make contacts 404, 406 are actuated, i.e. closed, mechanically synchronously at least during energization of the coil 402. Owing to, for example, mechanically forced closing of the make contact 406 by a user, the relay 400 is caused to latch, as a result of which the make contact 404 is closed and the drive motor 28 is switched on. In the description below, however, it is assumed that the third and fourth embodiments of the protection device are based on the electrical circuitry from FIG. 6.

Figure 8A:
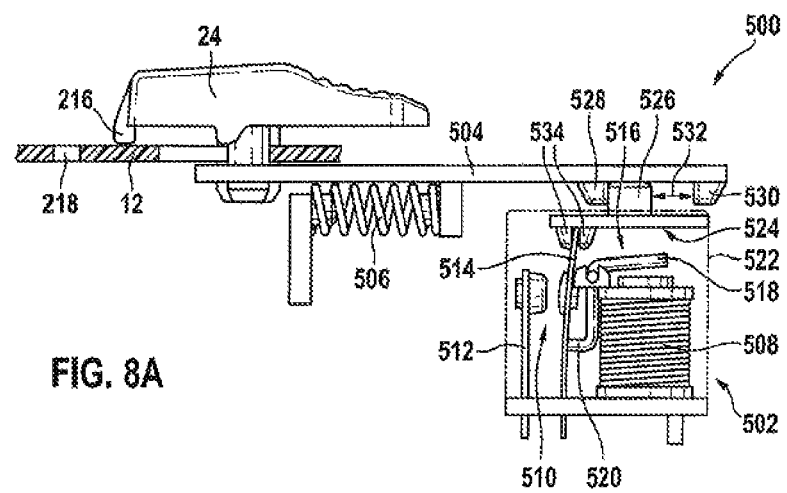
FIG. 8A shows a side view of the third embodiment of a protection device.
Figure 8B:
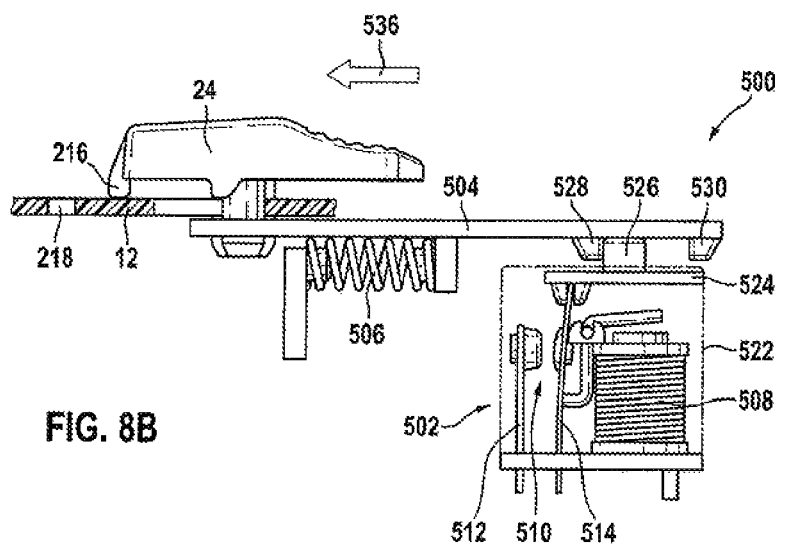
FIGS. 8B-8F show side views of the third embodiment of the protection device shown in FIG. 8A with four different electrical switching states of an associated relay.

FIG. 8A illustrates a protection device 500 in accordance with the third embodiment, which protection device has a relay 502, which is coupled mechanically to a sliding element 504 which is accommodated longitudinally displaceably on the tool housing 12 of the handheld machine tool 10 from FIG. 1. As in the case of the sliding element 204 from FIG. 5B, the slide switch 24 is accommodated tiltably in a sprung manner on the sliding element 504, the lower-side latching tab 216 of said slide switch 24 being capable of latching into the cutout 218 in the tool housing 12. The sliding element 504 is mechanically pretensioned by means of a compression spring 506 supported on the tool housing 12.

The relay 502 has a coil 508 and a make contact 510, which has a fixed contact arm 512 and an elastic contact arm 514. An angular armature 516 of the relay 502 has a first and a second limb 518, 520 and is preferably mounted at least slightly tiltably in the region of the armature 516.

A mechanical coupling, preferably with play, between the sliding element 504 and the relay 502 takes place by means of a contact slide 524 which is accommodated in longitudinally displaceable fashion within a housing 522 of the relay 502. Said contact slide has a, for example, right-parallelepipedal projection 526 on an upper side facing the sliding element 504, which projection is positioned between a first and a second transverse rib 528, 530, which are spaced apart from one another and are formed on the lower side of the sliding element 504. Axial play 532 remains between the projection 526 and the transverse ribs 528, 530 of the contact slide 524. An internal clearance between the two transverse ribs 528, 530 in this case corresponds at least approximately to the axial play 532 plus a width of the projection 526. A fork 534 for accommodating, in articulated fashion, one end of the elastic contact arm 514 of the make contact 510 is formed on a lower side, facing the coil 508, of the contact slide 524.

Corresponding electrical circuitry of the protection device 500 is provided preferably similarly to as described in FIG. 6. Alternatively, circuitry as shown in FIG. 7 can also be used, in which the relay has an additional make contact for electrically decoupling the (relay) coil current from the drive motor current.

FIG. 8B to FIG. 8F, to which reference is also made in the description below, each show side views of the third embodiment of the protection device from FIG. 8A with four different electrical and mechanical states of an associated relay for explaining the electrical and mechanical functioning. In a state shown in FIG. 8B, the slide switch 24 is in its "switch-off position", in which the latching tab 216 is unlatched from the cutout 218 in the tool housing 12, and in which the relay 502 of the protection device 500 has dropped out and the make contact 510 is open, with the result that the drive motor 28 from FIG. 1 is switched off and the latching of the relay 502 is canceled. The first transverse rib 528 bears against the projection 526 of the contact slide 524 owing to the force effect of the compression spring 506, said contact slide 524 for its part stopping on the inside against the housing 522 of the relay 502 which acts as path limitation.

Figure 8C:
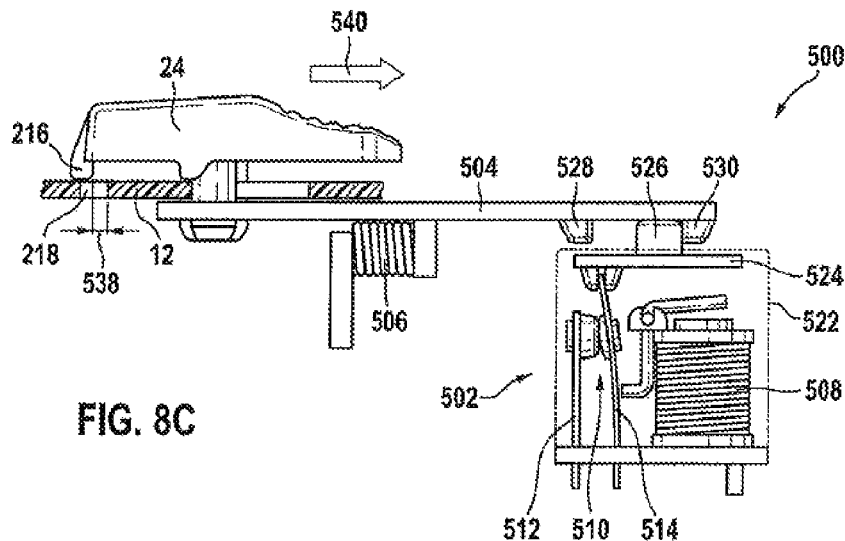
Figure 8D:
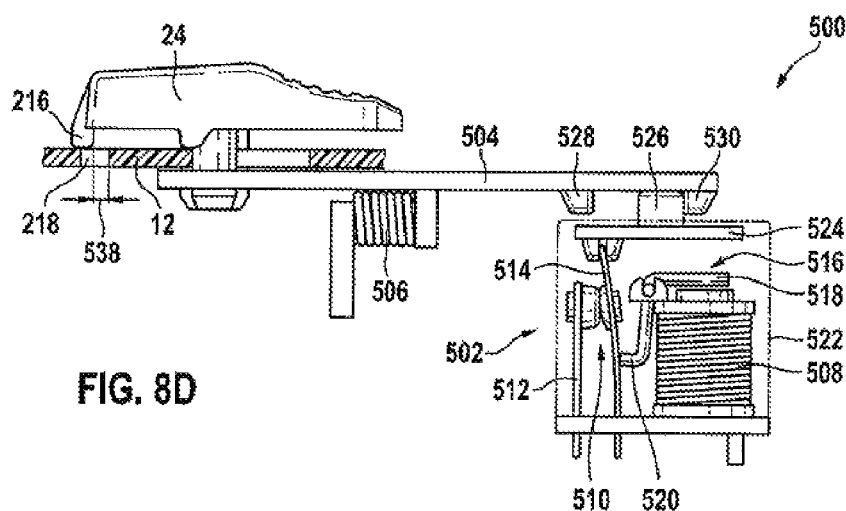

By virtue of a user displacing the slide switch 24 in the direction of an arrow 536 and counter to the force effect of the compression spring 506, the slide switch 24 reaches an "end position" shown in FIG. 8C. In this case, the flexible contact arm 514 is bent, mechanically forced by means of the contact slide 524, in the direction of the fixed contact arm 512 so far that the make contact 510 of the relay 502 closes and the drive motor 28 from FIG. 1 and the coil 508 are energized, wherein the relay 502 starts to transfer to the latching state. In this "end position" of the slide switch 24, the latching tab 216 has overrun the cutout 218 in the tool housing 12 by a short length 538, which is preferably at least 1 mm. The projection 526 of the contact slide 524 in this case rests on the second (rear) transverse rib 530 of the sliding element 504. As a result, the coil 508, as shown in FIG. 8D, can attract the first limb 518 of the armature 516, as a result of which the second limb 520 of the angular armature 516 comes to rest against the elastic contact arm 514 and the relay 502 is located in the attracted state. As a result, the elastic contact arm 514 is at the same time held in its reached position, with the result that the relay 502 is in the latching state. The horizontal position of the slide switch 24, of the sliding element 504 and of the contact slide 524 in this case remain unchanged.

Figure 8E:
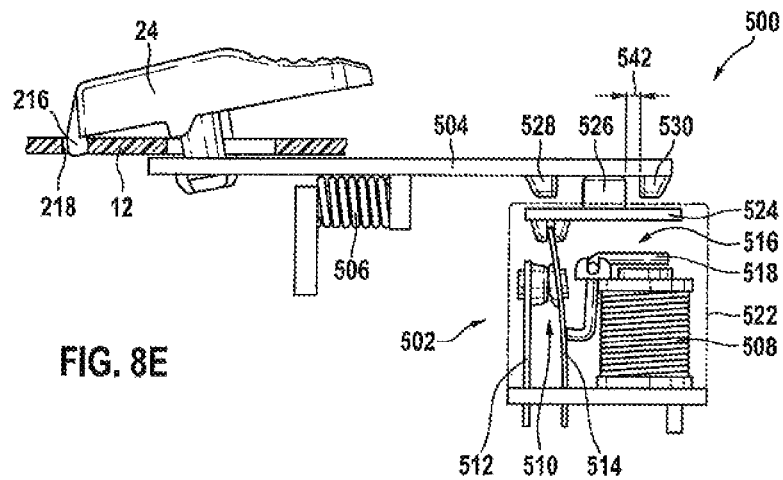

When a corresponding user now releases the slide switch 24 from the end position shown in FIG. 8D, this slide switch is displaced together with the sliding element 504 back in the direction of the relay 502 owing to the force effect of the compression spring 506, with the result that the latching tab 216, as can be seen from FIG. 8E, latches into the cutout 218 in the tool housing 12 and, in addition to the electromechanical latching of the relay 502, mechanical securing of the slide switch 24 and of the sliding element 504 in position in a latched-in "operating position" of the slide switch 24 which is then reached is provided.

The electrical switching state of the relay 502 remains unchanged owing to its latching, with the result that the make contact 510 of the relay 502 is still closed and the drive motor 28 from FIG. 1 remains permanently switched on. In this position, there is a horizontal clearance 542 between the second (rear) rib 530 of the sliding element 504 and the projection 526 of the contact slide 524, which clearance approximately corresponds to the length 538 (cf. FIG. 8D). As a result of the clearance 542, in the latched-in state of the slide switch 24, the absolutely necessary axial play between the sliding element 504 and the contact slide 524 is provided, which in turn enables opening of the make contact 510 when the coil 508 of the relay 502 is deenergized and, as a result of this, the armature 516 or the first limb 518 falls away from the coil 508.

Figure 8F:
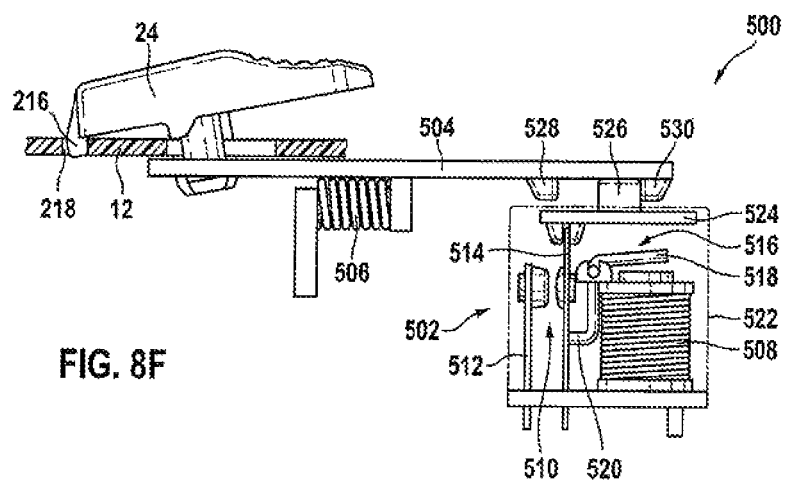

If an unexpected interruption to the power supply occurs, the coil 508 of the relay 502 is deenergized, as a result of which the first limb 518 of the armature 516, as shown in FIG. 8F, falls away from the coil 508 and the second limb 520 of the angular armature 516 is forced back from the elastic contact arm 514 into its rest position owing to the spring effect of said elastic contact arm, in which rest position it rests against the coil 508. This results in the make contact 510 opening and the latching of the relay 502 being canceled without delay and therefore the drive motor 28 from FIG. 1 being switched off. In the event of a return of the power supply, the drive motor does not restart since the make contact 510 of the relay 502 is unchanged in the open position. In order to switch on the drive motor again, it is necessary for the user first to unlatch the slide switch 24 out of the cutout 218 in the tool housing 12, as a result of which the slide switch 24 slides back into its "switch-off position" shown in FIG. 8B, without delay, owing to the force effect of the compression spring 506. Renewed switching-on of the drive motor then takes place by renewed actuation of the slide switch 24 as described in FIG. 8B to FIG. 8E, until, in turn, the "operating position" of the slide switch 24 which is mechanically latched with the tool housing 12 is reached and the drive motor of the handheld machine tool 10 from FIG. 1 is switched on and the latching of the relay 502 is activated.

Figure 9A:
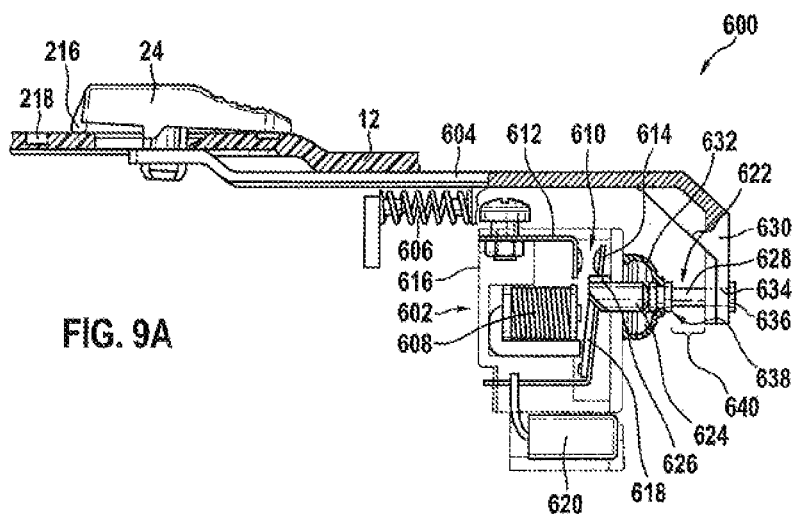
FIG. 9A shows a side view of the fourth embodiment of a protection device.

FIG. 9A shows a protection device 600 in accordance with the fourth embodiment, which protection device has a relay 602, which is coupled, as is the relay 502 from FIG. 8A, mechanically to a sliding element 604, which is accommodated in longitudinally displaceable fashion on the tool housing 12 of the handheld machine tool. As in the case of the sliding element 204 from FIG. 5B, the slide switch 24 is accommodated tiltably in a sprung manner on the sliding element 604, and the latching tab 216 is formed on the lower side of said slide switch, which latching tab is latchable with the cutout 218 in the tool housing 12 in order to enable haptically and intuitively detectable feedback for a user in respect of the "operating position" of the slide switch 24 being reached and furthermore to mechanically fix the position of said slide switch in this position. The sliding element 604 is pretensioned mechanically in the axial direction by means of a compression spring 606 which is supported on the tool housing 12 and is connected to the sliding element 604.

The relay 602 has a coil 608 and a make contact 610. The make contact 610 is formed with a bent-back, preferably fixed contact arm 612 and a preferably movable contact arm 614. The fixed contact arm 612 is fastened on the inside on a housing 616 of the relay 602, while the movable contact arm 612 is fastened at one end on an illustratively plate-shaped armature 618, which is articulated pivotably on the inside on the housing 616 of the relay 602, for example by means of a film hinge. The armature 618 is magnetically attracted by the coil 608 by energization of said coil, as a result of which the make contact 610 of the relay 602 is closed. In addition, a capacitor 620 for radio interference suppression is integrated in the housing 616. An outer geometry of the housing 616 is preferably identical to the outer dimensions of electrical switches conventionally used in mains-operated handheld machine tools without restart protection, with the result that replacement is possible without any modifications to the mass production process.

Mechanically forced actuation of the armature 618 preferably takes place by means of a substantially cylindrical plunger 622, which has a bearing section 624 comprising a, for example, fork-shaped receptacle 626 for articulating the movable contact arm 614 or the armature 618. The bearing section 624 is adjoined by a coupling section 628, which has, for example, a reduced cross section in comparison with the bearing section 624 and is used for mechanical coupling to a bent-back limb 630 of the sliding element 604. By virtue of its bearing section 624, the plunger 622 is accommodated in axially displaceable fashion in the housing 616 of the relay 602. An optional sealing element 632 in the form of an elastic bellows consisting of an elastomer or the like is fastened on the housing 616 and on the bearing section 624 of the plunger 622 in order to prevent the ingress of foreign particles into the housing 616 of the relay 602. For the axial coupling, with play, between the plunger 622 and the sliding element 604 which is functionally necessary, a bore 634 is provided in the limb 630 for passing through the coupling section 628. In order to prevent the plunger 622 from sliding off from the limb 630 of the sliding element 604, a disk-shaped or mushroom-shaped stop 636 is provided at the end on the coupling section 628 of the plunger 622, the outer diameter of said stop being at least slightly greater than an inner diameter of the bore 634. A further end stop for the limb 630 is formed by a shoulder 638 between the bearing section 624 and the coupling section 628 of the plunger 622. Therefore, there is axial play 640 between the shoulder 638 and the stop 636 which is formed spaced apart therefrom on the plunger 622, which results in the limb 630 of the sliding element 604 and the plunger 622 being displaceable relative to one another through the axial play 640.

Figure 9B:
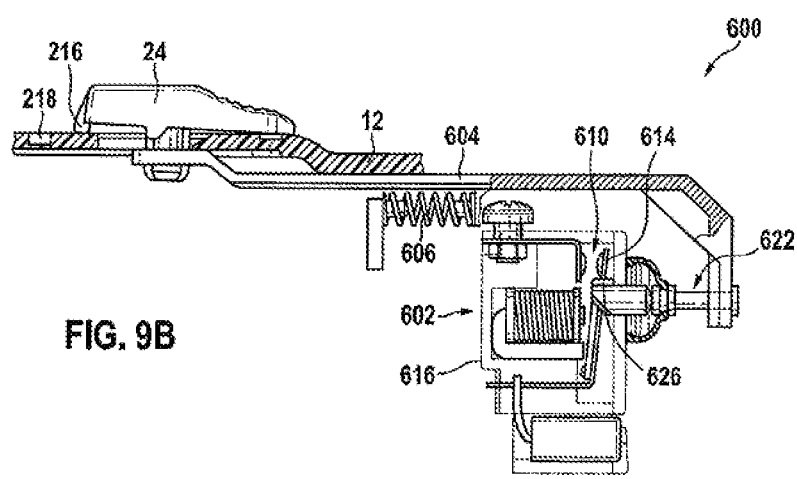
FIGS. 9B-9F show side views of the fourth embodiment of the protection device shown in FIG. 9A with four different electrical switching states of an associated relay.

FIG. 9B to FIG. 9F, to which reference is also made in the description below, each show side views of the fourth embodiment of the protection device from FIG. 9A with four different electrical and mechanical states of an associated relay for explaining the electrical and mechanical functioning. In FIG. 9B, the latching tab 216 of the slide switch 24 is unlatched from the cutout 218 in the tool housing 12, and the slide switch 24 is moved, together with the sliding element 604, as far as into a "switch-off position" shown, as a result of the force effect of the compression spring 606, in which position at the same time the plunger 622 assumes a position which is protruding out of or withdrawn from the housing 616 of the relay 602 to a maximum extent. The receptacle 626 of the plunger 622 for the movable contact arm 614 stops on the inside against the housing 616 of the relay 602 and thus forms a necessary axial path limitation for the plunger 622.

Figure 9C:
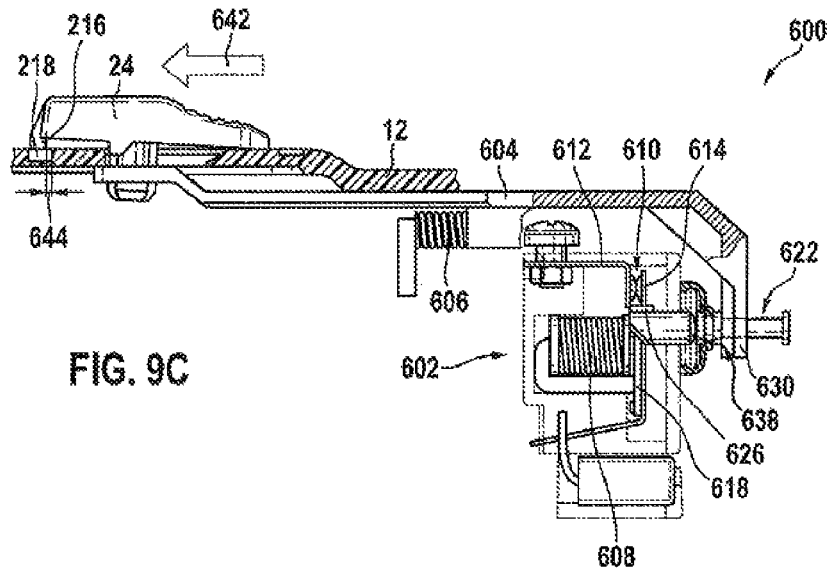

In the "switch-off position", the make contact 610 of the relay 602 is open, the drive motor 28 of the handheld machine tool 10 from FIG. 1 is switched off, and the latching of the relay 602 is canceled (cf. in particular FIG. 6). As shown in FIG. 9C, in order to switch on the drive motor, the slide switch 24 is displaced by the user in the direction of an arrow 642 counter to the force effect of the compression spring 606 until the slide switch 24 and the sliding element 604 have reached an "end position" illustrated in FIG. 9C. In this "end position", the latching tab 216 of the slide switch 24 has overrun the cutout 218 in the tool housing 12 by a short length 644, wherein this length 644 is preferably at least 1 mm. Owing to this circumstance, the slide switch 24 does not yet latch with the housing 12 of the handheld machine tool in the "end position" shown.

The plunger 622 is carried along by the limb 630 of the sliding element 604, which limb is displaced in the direction of the arrow 642, by means of the shoulder 638 of said plunger in this movement operation. As a result, the movable contact arm 614 is brought to rest against the fixed contact arm 612 by the receptacle 626 of the plunger 622 and, as a result, the make contact 610 of the relay 602 is closed in a forced manner. This in turn results in the drive motor 28 from FIG. 1 being switched on and the coil 608 of the relay 602 being energized, as a result of which the armature 618 is magnetically attracted by the coil 608 and the relay 602 is caused to latch. In the position of the slide switch 24 shown in FIG. 9C, in addition the compression spring 606 preferably has reached its furthest compressed state.

Figure 9D:
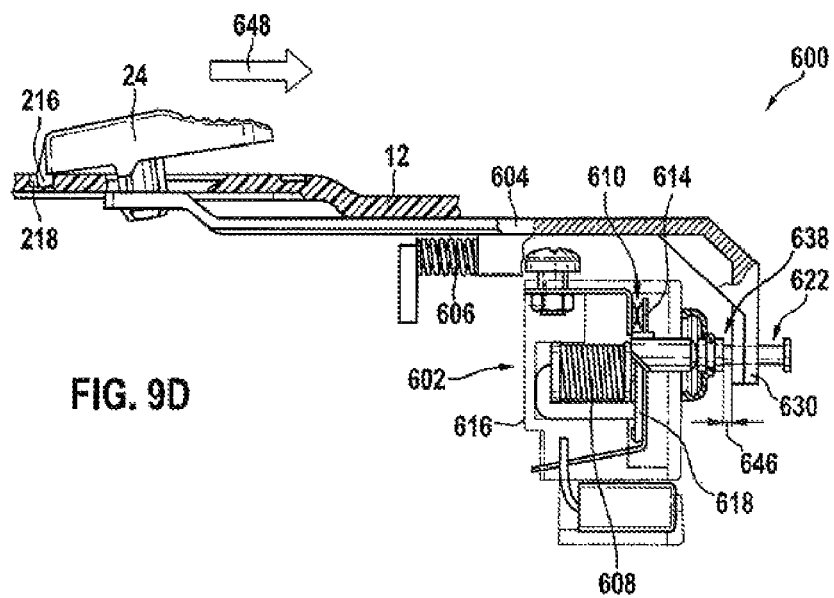

As shown in FIG. 9D, the slide switch 24, on the basis of FIG. 9C, has assumed a mechanically latched-in "operating position" as a result of the slide switch 24 being released by the user and as a result of the restoring force of the compression spring 606, in which "operating position" the drive motor 28 from FIG. 1 remains permanently switched on independently of continued actuation of the slide switch 24 by the user owing to latching of the relay 602. During the transition from the "end position" to the "operating position", the slide switch 24 slides back again through the length 644 into its mechanically latched-in position. In the mechanically latched-in state, the latching tab 216 of the slide switch 24 is accommodated at least regionally in a form-fitting manner in the cutout 218 in the tool housing 12. When the coil 608 is energized, the relay 602 still remains in the attracted state, with the result that the make contact 610 remains permanently closed when the armature 618 is attracted. Starting from its axial position shown in FIG. 9C, the limb 630 of the sliding element 604 has lifted off from the shoulder 638 of the plunger 622 through a length 646. The length 646 corresponds approximately to the length 644, for example (cf. FIG. 9C).

Figure 9E:
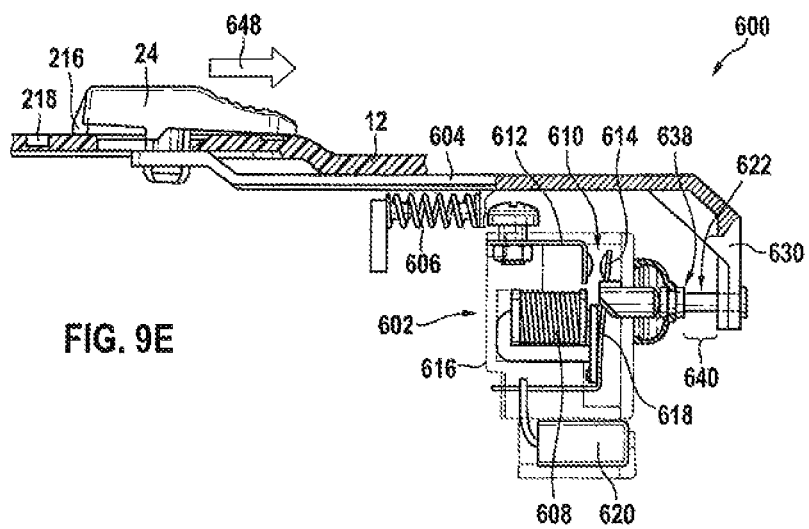

In order to switch off the drive motor 28 of the handheld machine tool 10 from FIG. 1 again, it is necessary for the user to push the slide switch 24 back, starting from the mechanically latched "operating position" shown in FIG. 9D, in the direction of an arrow 648 with the assistance of the force effect exerted by the compression spring 606 until a "switch-off position" of the slide switch 24 as shown in FIG. 9E has been reached and the latching tab 216 is unlatched from the cutout 218 in the tool housing 12 again.

With assistance of the force effect of the compression spring 606, during this user-initiated, mechanical switch-off operation, the plunger 622 is withdrawn from the housing 616 of the relay 602 by the limb 630 of the sliding element 604 until the "switch-off position" of the sliding switch 24 shown in FIG. 9E has been reached again. As a result of this, the movable contact arm 614 is lifted off from the fixed contact arm 612 of the relay 602 by mechanical force counter to the magnetic attraction force of the coil 608 which is still acting on the armature 618, as a result of which the make contact 610 of the relay 602 opens and the coil 608 is deenergized. As a result, the latching of the relay 602 is canceled and the drive motor 28 from FIG. 1 is switched off. In the position of the slide switch 24 shown, again the axial play 640 (cf. also FIG. 9A) exists between the limb 630 of the sliding element 604 and the shoulder 638 of the plunger 622. The capacitor 620 is used merely for radio interference suppression of the make contact 610 when the movable contact 614 lifts off from the fixed contact 612.

Figure 9F:
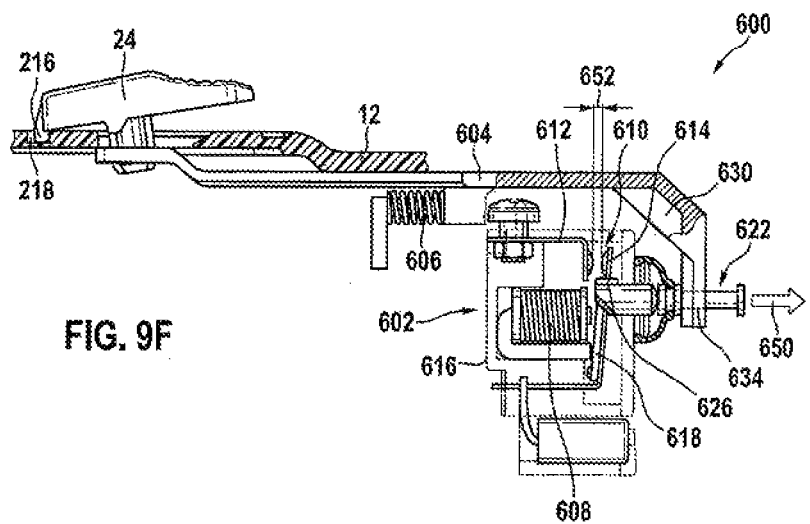

If, starting from the mechanically latched-in "operating position" of the slide switch 24 as shown in FIG. 9D, a current interruption nevertheless occurs, in an unexpected manner, the latching of the relay 602 collapses immediately owing to the lack of energization, then occurring, of the coil 608 of the relay 602, and the make contact 610 of the relay 602 assumes its open position, shown in FIG. 9F. During this process, the movable contact 614 which springs back automatically or by its own force carries along the plunger 622 with the aid of the fork-shaped receptacle 626 in the direction of an arrow 650, independently of the slide switch 24 which is still mechanically latched with the housing 12 and the sliding element 604 which is connected to said slide switch. This is possible since the plunger 622, starting from its position shown in FIG. 9D with the coil 608 deenergized, can be displaced back within the bore 634 of the limb 630 of the sliding element 604 by the length 646 independently of said sliding element. The length 646 is greater than or equal to a contact clearance 652 between the fixed contact arm 612 and the movable contact arm 614 in the open state of the make contact 610 in order to achieve reliable electrical isolation. In the case of a return of the power supply, the drive motor 28 from FIG. 1 cannot restart since the make contact 610 of the relay 602 remains open, with the result that neither the drive motor nor the coil 608 of the relay 602 can be energized again.

In order to switch on the drive motor 28 from FIG. 1 again starting from the position of the slide switch 24 shown in FIG. 9F, it is first necessary for the user to mechanically unlatch the slide switch 24 and push it back into the "switch-off position" shown in FIG. 9A and FIG. 9B in relation to the tool housing 12. Then, the drive motor can be started again without an impairment to the operational safety by renewed displacement of the slide switch 24 starting from the "switch-off position" shown in FIG. 9A and 9B until the "operating position" shown in FIG. 9D is reached.

The invention claimed is:

1. A mains-operated handheld machine tool, comprising:
a tool housing;
an electric drive motor arranged in the tool housing and configured to drive an associated tool insert;
a slide switch coupled to a sliding element configured to switch the drive motor on and off, the slide switch being arranged, at least in longitudinally displaceable fashion, on the tool housing; and
a protection device including an electromechanical relay, the protection device being configured to prevent, by way of the electromechanical relay, uncontrolled restarting of the drive motor after an interruption to a corresponding power supply to the drive motor as a result of latching of the relay being canceled,
wherein the protection device has an electrical switch comprising a make contact and a break contact,
wherein the make contact and the break contact are actuable by a lever that is accommodated tiltably on the plunger, and
wherein the lever is guided circumferentially in a slotted-link slideway with an approximately quadrilateral outline, and the slotted-link slideway has at least one diagonally running slideway section.

2. The handheld machine tool according to claim 1, wherein the slide switch is accommodated, tiltably, on the sliding element and is latchable to the tool housing in an operating position when the drive motor is switched on.

3. The handheld machine tool according to claim 1, wherein the electrical switch has a plunger, which is pretensioned by a compression spring and is axially displaceable, counter to a spring force applied by the compression spring, by the sliding element.

4. The handheld machine tool according to claim 1, wherein the make contact is closable, at least for a short period of time, by axial actuation of the plunger out of a rest position in order to cause the relay to latch and to switch on the drive motor, and wherein the plunger remains in a pressed-in position.

5. The handheld machine tool according to claim 4, wherein the break contact is openable by a further axial actuation of the plunger for switching off the drive motor in order to cancel the latching of the relay, and wherein the plunger is caused to move back into its rest position by the spring force of the compression spring.

6. The handheld machine tool according to claim 1, wherein the electrical switch has a plunger, which is pretensioned by a compression spring and comprises an actuating hook, and wherein the plunger is displaceable axially by the sliding element counter to a spring force applied by the compression spring.

7. The handheld machine tool according to claim 6, wherein the actuating hook is arranged in the region between the make contact and the break contact of the electrical switch so as to enable alternate actuation of the make contact and the break contact.

8. The handheld machine tool according to claim 6, wherein the make contact is opened in a latched-in operating state of the slide switch and the break contact is closed, and wherein the drive motor is switched on by the latching of the relay.

9. A mains-operated handheld machine tool, comprising:
a tool housing;
an electric drive motor arranged in the tool housing and configured to drive an associated tool insert;
a slide switch coupled to a sliding element configured to switch the drive motor on and off, the slide switch being arranged, at least in longitudinally displaceable fashion, on the tool housing; and
a protection device including an electromechanical relay, the protection device being configured to prevent, by way of the electromechanical relay, uncontrolled restarting of the drive motor after an interruption to a corresponding power supply to the drive motor as a result of latching of the relay being canceled,
wherein the sliding element is pretensioned by a compression spring supported on the tool housing, and
wherein a contact slide is displaceable within the relay parallel to the sliding element with play by the sliding element so as to energize a coil of the relay by forced mechanical closing of a make contact of the relay.

10. The handheld machine tool according to claim 9, wherein the relay, for latching purposes, has a bent-back armature which is mounted tiltably within the relay and comprises a first limb and a second limb, and wherein owing to the energization of the coil, the first limb is attracted thereby magnetically such that, in the energized state of the coil, the make contact of the relay is configured to be held mechanically in the closed switching state by the second limb.

11. A mains-operated handheld machine tool, comprising:
a tool housing;
an electric drive motor arranged in the tool housing and configured to drive an associated tool insert;
a slide switch coupled to a sliding element configured to switch the drive motor on and off, the slide switch being arranged, at least in longitudinally displaceable fashion, on the tool housing; and
a protection device including an electromechanical relay, the protection device being configured to prevent, by way of the electromechanical relay, uncontrolled restarting of the drive motor after an interruption to a corresponding power supply to the drive motor as a result of latching of the relay being canceled,
wherein the sliding element is pretensioned by a compression spring supported on the tool housing, and
wherein the relay has a coil and a plate-shaped armature which is magnetically attractable by the coil, and a make contact of the relay is actuable by the armature.

12. The handheld machine tool according to claim 11, wherein a plunger which protrudes out of the relay for actuating the armature is displaceable parallel to the sliding element with play by the sliding element.

13. The handheld machine tool according to claim 12, wherein the plunger is sealed off from a housing of the relay by a sealing element.

14. The handheld machine tool according to claim 12, wherein, by mechanically forced actuation of the plunger by the sliding element, a make contact of the relay is closable and the coil of the relay is energizable in order to switch on the drive motor and cause the relay to latch.

15. The handheld machine tool according to claim 11, wherein the relay, in terms of its outer geometry, is identical in construction to a standard electrical switch for switching on and off the drive motor of the handheld machine tool.

* * * * *